United States Patent
Babcock et al.

(10) Patent No.: US 9,725,644 B2
(45) Date of Patent: Aug. 8, 2017

(54) Y-GRADE NGL STIMULATION FLUIDS

(71) Applicants: Linde Aktiengesellschaft, Munich (DE); John A. Babcock, Houston, TX (US)

(72) Inventors: John A. Babcock, Houston, TX (US); Marcus Guzmann, Munsing (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 48 days.

(21) Appl. No.: 14/878,196

(22) Filed: Oct. 8, 2015

(65) Prior Publication Data

US 2016/0122628 A1     May 5, 2016

Related U.S. Application Data

(60) Provisional application No. 62/067,142, filed on Oct. 22, 2014.

(51) Int. Cl.

| | |
|---|---|
| *E21B 43/25* | (2006.01) |
| *C09K 8/80* | (2006.01) |
| *C09K 8/64* | (2006.01) |
| *C09K 8/82* | (2006.01) |
| *C09K 8/92* | (2006.01) |
| *E21B 43/16* | (2006.01) |
| *E21B 43/267* | (2006.01) |
| *E21B 47/00* | (2012.01) |
| *C09K 8/94* | (2006.01) |

(52) U.S. Cl.
CPC .............. *C09K 8/80* (2013.01); *C09K 8/64* (2013.01); *C09K 8/82* (2013.01); *C09K 8/92* (2013.01); *E21B 43/164* (2013.01); *E21B 43/255* (2013.01); *E21B 43/267* (2013.01); *E21B 47/00* (2013.01); *C09K 8/94* (2013.01)

(58) Field of Classification Search
CPC ........ E21B 43/24; E21B 43/267; E21B 43/26; E21B 43/16; E21B 43/164
See application file for complete search history.

(56) References Cited

U.S. PATENT DOCUMENTS

| | | | |
|---|---|---|---|
| 3,368,627 A | 2/1968 | Hurst et al. | |
| 4,511,381 A * | 4/1985 | Mehra | C07C 7/11 62/625 |
| 2005/0189112 A1 | 9/2005 | Taylor et al. | |
| 2012/0000660 A1 | 1/2012 | Gatlin et al. | |
| 2013/0220605 A1* | 8/2013 | Vandor | E21B 43/267 166/267 |
| 2014/0124208 A1 | 5/2014 | Loree et al. | |
| 2015/0167550 A1* | 6/2015 | Vandervort | F02C 3/20 60/780 |

FOREIGN PATENT DOCUMENTS

DE      102014010105 A1      1/2016

OTHER PUBLICATIONS

International Search Report and Written Opinion—PCT/US2015/055627, International Search Authority—EPO, Jan. 8, 2016.
S.Rassenfoss; "In Search of the Waterless Fracture", JPT, Jun. 30, 2013, pp. 46-54, XP055237780.

* cited by examiner

*Primary Examiner* — Zakiya W Bates
(74) *Attorney, Agent, or Firm* — Patterson & Sheridan, LLP

(57) ABSTRACT

Y-Grade NGL fracturing systems and methods of using Y-Grade NGL stimulation fluids.

16 Claims, 11 Drawing Sheets

Y-GRADE NGL STIMULATION FLUIDS

CROSS REFERENCE TO RELATED APPLICATION

This application claims benefit of U.S. Provisional Application Ser. No. 62/067,142, filed Oct. 22, 2014, the contents of which are herein incorporated by reference in their entirety.

BACKGROUND

Field of the Disclosure

Embodiments of this disclosure generally relate to stimulation fluids.

Description of the Related Art

Fracture treatments are utilized to stimulate and improve fluid conductivity between a wellbore and a formation of interest to increase fluid production rate and associated reserves. Hydraulic fracture treatments are typically used in low-permeability formations, in conventional reservoirs to bypass near-wellbore permeability damage, and in unconventional reservoirs to intersect induced fractures with a natural fracture network.

Hydraulic stimulation fluids have been classified into different fluid types, including:

Conventional, comprised of a gelling agent and cross-linker(s);

Water Frac, (sometimes referred to as "slick water") comprised of a friction reducer, gelling agent, and/or a viscoelastic surfactant;

Hybrid, comprised of a combination of friction reducer, gelling agent, and crosslinker(s);

Energized, incorporating carbon dioxide or nitrogen into the fluid;

Acid Frac, comprised of a gelled acid base; and

Gas Frac, comprised of a gas, normally propane as the base fluid.

A typical treatment injects a viscous stimulation fluid to open a fracture of a desired geometry, and the viscous stimulation fluid carries a proppant into the opened fracture to maintain conductivity in the fracture after the treatment is completed. Viscous stimulation fluids may have features that damage the permeability of the proppant pack and/or the formation near the fracture. For example, water-based stimulation fluids may imbibe into the formation face and reduce permeability by e.g. capillary forces, may precipitate scale, and may cause fines migration during well flow back and clean-up.

Recent data suggests that approximately 98% of the hydraulic fracture stimulations in the U.S. utilize water-based technology. Minimizing or eliminating water and the associated water-based chemicals (such as acids, biocides, corrosion inhibitors, oxygen scavengers, friction reducers, crosslinkers, breakers, and certain gelling agents) from the base fluid would help reduce the environmental footprint and certain chemical costs associated with fracing.

Water-based frac fluids also have associated disposal and or clean-up issues and may have usage conflicts. Use of water for hydraulic fracturing can divert water from stream flow, water supplies for municipalities and industries such as power generation, as well as recreation and aquatic life. After a fracture treatment, frac fluid that flows back to the surface must be disposed of or remediated, and the more fluid that is utilized in the treatment the greater the disposal risk and expense. The large volumes of water required for most common hydraulic fracturing methods have raised concerns for arid regions particularly in drought-prone Texas. Frac water disposal via injection into deep underground wells has been associated with recent increases in seismicity in Central Oklahoma.

Massive hydraulic fracturing uses traditionally between 1.2 and 3.5 million US gallons of water per well, with large projects using more than 5 million US gallons. Each treatment is comprised of a series of stages. Certain unconventional horizontal wells may have up to 40 or more stages. Each stage may utilize more than 300,000 gallons of water and more than 5.5 million pounds of proppant.

Multi-well pad drilling or the ability to drill and complete multiple wells on a single pad is becoming prevalent in the industry because of the small footprint and increased operational efficiency. This technology is affecting the hydraulic fracturing industry as six or more individual well stimulations may be conducted sequentially from a single pad. Complementing this technology is a process known as "zipper fracs" that involves alternating frac stimulations between two offsetting wells whose wellheads are located on the same pad. When combined, these technologies place additional logistical requirements on the fracing operator.

Acid fracturing treatments are utilized to remove damage and/or open channels in the formation. The acid etches channels that, in theory, remain open after the hydraulic pressure is released and the formation relaxes back to a naturally pressured condition. It is desirable that the acid flow into and etch or remove damage from areas of the formation that do not flow well before the treatment. However, the highly permeable and naturally fractured areas of the formation tend to accept fluid better and thereby take more of the acid than is desired. Therefore, fluid loss and diverting additives may be added to the acid fracturing treatment to block the high permeability channels and redirect the treatment into lower permeability channels.

Foam fracturing is also a standard method used in North America to stimulate low-permeability or partially pressured depleted reservoirs including unconventional shale and coal seams. Foam based frac fluids can be attractive due to the low water content as the foam typically consists of a high percentage of a gas, typically carbon dioxide or nitrogen, as the internal phase and a lesser percentage of a liquid as the external phase that includes a stabilizing surfactant called a foaming agent. Foams at nitrogen qualities of 70 to 90 percent have been applied effectively in the formation types mentioned above. High quality foams require less water but may lack sufficient viscosity to support the necessary proppant load.

Liquefied petroleum gas ("LPG"), primarily propane gel, has been used as a hydrocarbon frac fluid that is non-damaging to the formation. Its properties include: low surface tension, low viscosity, low-density, along with miscibility with naturally occurring reservoir hydrocarbons. This waterless method increases initial production rates, helping establish production much sooner than traditional fracturing methods. It is also able to recover the majority of the fracturing fluid within a few days of the stimulation which create economic and environmental benefits of a quick clean-up with minimal waste and disposal. However, the cost and availability of large quantities of propane required for multi-stage pad stimulations is sometimes a deterrent to the using this technology.

Therefore, there is a need for new stimulation fluids that are non-damaging to the formation, have minimal water content and chemical additions, are naturally occurring and locally available components, have fast clean-up, are cost effective, and are totally recoverable with minimal proppant flow back.

SUMMARY

One embodiment of this disclosure comprises a foamed Y-Grade NGL based stimulation fluid. The foam may be generated with nitrogen or carbon dioxide and include a surfactant(s). The quality of the foam may be between about 55% to about 95%. Foaming of the Y-Grade NGL can be accomplished by using a foaming agent(s), such as ionic or nonionic surfactants or mixtures thereof. The foaming agent(s) may comprise sulfonic acids, betaine compounds, fluorosurfactants, hydrocarbon solvents, aluminum soaps, phosphate esters, and/or other similar products.

Foaming agents may comprise either the pure surfactants or surfactant mixtures, could be blended with co-surfactants, or could be aqueous solutions of surfactants and/or co-surfactants, and optionally co-solvents. Co-surfactants can comprise iC90-glycol and/or iC10-glycol. Co-solvents can comprise 1-propanol, iso-propanol, 2-butanol, and/or butyl glycol.

Foaming agents may comprise surfactants, both anionic surfactants and cationic surfactants, and/or nonionic and amphoteric structures, preferably anionic, nonionic, and amphoteric structures. Examples of foaming agents comprise alcoholethersulfates, alcohol sulfate, alcylsulfates, isethionates, sarconisates, acylsarcosinates, olefinsulfonates, alcylethercarboxylates, alcylalcoholamides, aminoxids, alkylbenzolsulfonate, alkylnaphthalene sulfonates, fattyalcohol ethoxylates, oxo-alcohol ethoxylates, alkylethoxylates, alkylphenolethoxylates, fattyamin- and fattyamidethoxylates, alkylpolyglucosides, oxoalcohol ethoxylates, and/or guerbetalcohol alkoxylates. Further examples comprise alkylethersulfonate, EO/PO blockpolymers, and/or betaines such as cocamidopropylbetaine and C8-C10 alkylamidopropylbetaine. Further examples comprise sulfobetaines, alkenylsulfonates, alkylglykols, alcoholalkoxylates, sulfosuccinates, al kyletherphosphates, esterquats, and/or di- and trialcylammoniumderivatives.

One embodiment of this disclosure comprises adding foam stabilizers to form a foamed Y-Grade NGL based stimulation fluid. Foam stabilizers can be microparticles or nanoparticles, such as silica or silica derivatives that are known to stabilize foam and emulsions through so-called "pickering". Foam stabilizers can also be proteins. Another class of foam stabilizers can be additives that increase the viscosity of the stimulation fluid composing the lamella, such as polymeric structures, e.g. polyacrylamide and/or its derivatives.

One embodiment of this disclosure comprises a gelled Y-Grade NGL stimulation fluid using phosphate esters and organo-metallic complex cross-linkers. The gelling agent may comprise phosphate esters, organo-metallic complex cross-linkers, amine carbamates, alumunin soaps, cocoamine (C12-C14), sebacoyl chloride, oley (C18) amine, toulen-2,4-diisocyanate, tolune-2,6-diisolcyanate, and any combination thereof.

One embodiment of this disclosure comprises an emulsion formed with Y-Grade NGL and up to about 10% water, seawater, formation water, and/or brine using an emulsifying agent(s). The emulsifying agent(s) may comprise surfactants, co-surfactants, and/or co-solvents.

One embodiment of this disclosure comprises an economically valuable method to reduce the high operating costs associated with the field delivery of a stimulation fluid by utilizing, recovering, and re-selling Y-Grade NGL.

One embodiment of this disclosure comprises inertization of proppant by carbon dioxide or nitrogen to avoid contamination with oxygen, an oxygen detector, and/or a carbon dioxide or nitrogen counter stream when filling proppant into storage facilities.

One embodiment of this disclosure comprises an economically valuable method to foam Y-Grade NGL using high frequency ultrasonic vibration and/or a venturi eductor to create micro bubbles to increase the load carrying capacity of the foam. The systems and methods as described in German patent application DE 102014010105.3, which is herein incorporated by reference, can be used with the embodiments described herein.

One embodiment of this disclosure comprises an economically valuable method to suppress the potential combustion of Y-Grade NGL foam or gelled Y-Grade NGL by deploying an emergency carbon dioxide gas, carbon dioxide based foam, and/or water based foam flooding system that can be actuated via remote control. One advantage of a foam based system is that the foam will not be carried away by wind and stays in position, which provides a less hazard risk.

One embodiment of this disclosure comprises one or more parts of system equipment and/or any one of the entire systems described herein comes in a container or is positioned in a closed chamber and is blanketed by carbon dioxide and/or nitrogen.

One embodiment of this disclosure comprises an economically valuable method to enhance the safety of pumping high pressure Y-Grade NGL foam or gelled Y-Grade NGL by utilizing an emergency blow down system that can be remotely activated.

One embodiment of this disclosure comprises an economically valuable method to enhance the safety of pumping high pressure Y-Grade NGL foam or gelled Y-Grade NGL by utilizing a combustible gas detection system to shut down high pressure pumping units and close-in a near wellhead remote actuated valve.

One embodiment of this disclosure comprises a gas detection system combined with an automated carbon dioxide gas, carbon dioxide based foam, nitrogen gas, nitrogen gas based foam, and/or air based foam flooding system.

One embodiment of this disclosure comprises an economically valuable method to reduce the high operating costs associated with the field delivery of liquid nitrogen by using field transportable membrane generation equipment or cryogenic air separation unit to separate nitrogen from air.

One embodiment of this disclosure comprises an economically valuable method to reject nitrogen from the produced gaseous hydrocarbon streams from surface gas-liquid separation processes to allow for transportable and/or commercial sales of the gaseous hydrocarbon stream if sufficient quantities are available, which will in turn eliminate the need to flare gas during the clean-up period.

One embodiment of this disclosure comprises a mobile carbon dioxide recovery unit to recover carbon dioxide from a produced hydrocarbon stream.

One embodiment of this disclosure comprises a Y-Grade NGL stimulation fluid having a proppant; ethane, wherein the ethane comprises about 30% to 80% of the fluid; propane, wherein the propane comprises about 15% to 50% of the fluid; butane, wherein the butane comprises about 15% to 45% of the fluid; isobutane, wherein the isobutane comprises about 15% to 40% of the fluid; and pentane plus, wherein the pentane plus comprises about 5% to 25% of the fluid. The fluid further comprises at least one of carbon dioxide and nitrogen. The fluid further comprises a foaming agent that includes at least one of a surfactant, a co-surfactant, and a co-solvent, and optionally includes a foam stabilizer. The fluid further comprises a gelling agent that includes at least one of phosphate esters and organo-metallic complex cross-linkers. The fluid further comprises an emulsifying agent that includes up to about 10% water or brine.

One embodiment of this disclosure comprises a Y-Grade stimulation fluid having about 30%-55% of at least one hydrocarbon compound having two carbon elements (C2); about 15%-50% of at least one hydrocarbon compound having three carbon elements (C3); about 15%-50% of at least one hydrocarbon compound having four carbon elements (C4); and about 5%-20% of at least one hydrocarbon compound having five carbon elements (C5) or more. The fluid further comprises a proppant, and at least one of carbon dioxide and nitrogen. The fluid further comprises a foaming agent that includes at least one of a surfactant, a co-surfactant, and a co-solvent, and optionally includes a foam stabilizer. The fluid further comprises a gelling agent that includes at least one of phosphate esters and organo-metallic complex cross-linkers. The fluid further comprises an emulsifying agent that includes up to about 10% water or brine.

One embodiment of this disclosure comprises a Y-Grade NGL system having a nitrogen and/or carbon dioxide source; a Y-Grade NGL source in fluid communication with the nitrogen and/or carbon dioxide source; a proppant source in fluid communication with the nitrogen and/or carbon dioxide source; a receiver-blender in fluid communication with the Y-Grade NGL source and the proppant source; and a pump configured to pump a fluid from the receiver-blender into a wellhead, wherein the fluid comprises a proppant from the proppant source, Y-Grade NGL from the Y-Grade NGL source, and at least one of nitrogen and carbon dioxide from the nitrogen and/or carbon dioxide source.

The system further comprises a foaming agent source and a foaming unit in fluid communication with the Y-Grade NGL source and the receiver-blender, wherein the foaming agent source comprises a foaming agent that includes at least one of a surfactant, a, co-surfactant, and a co-solvent. The foaming unit includes a venturi eductor, a high frequency ultrasonic sonde, and/or a micro mesh screen. The system further comprises a gelling agent source in fluid communication with the receiver-blender, wherein the gelling agent source comprises a gelling agent that includes at least one of phosphate esters and organo-metallic complex cross-linkers. The system further comprises an emulsifying agent source in fluid communication with the receiver-blender, wherein the emulsifying agent source comprises an emulsifying agent. The system further comprises a pressure regulation compressor configured to regulate pressure within the receiver-blender. The system further comprises a field separation unit configured to receive a wet gas stream from the same or a different wellhead, separate Y-Grade NGL from the wet gas stream, and supply Y-Grade NGL to the Y-Grade NGL source directly via a fluid line or storage tankers. The system further comprises air separation equipment configured to separate nitrogen from air and supply nitrogen to the nitrogen source.

One embodiment of this disclosure comprises a method of pumping a Y-Grade NGL stimulation fluid into a hydrocarbon bearing reservoir comprising blending Y-Grade NGL, a proppant, and at least one of nitrogen and carbon dioxide in a receiver-blender to form a stimulation fluid; and pumping the stimulation fluid into the hydrocarbon bearing reservoir.

The method further comprises blending a foaming agent and optionally a foam stabilizer with the Y-Grade NGL, the proppant, and at least one of nitrogen and carbon dioxide in the receiver-blender to form the stimulation fluid, wherein the foaming agent includes at least one of a surfactant, a co-surfactant, and a co-solvent, and optionally includes a foam stabilizer.

The method further comprises blending a gelling agent with the Y-Grade NGL, the proppant, and at least one of nitrogen and carbon dioxide in the receiver-blender to form the stimulation fluid, wherein the gelling agent includes at least one of phosphate esters and organo-metallic complex cross-linkers.

The method further comprises blending an emulsifying agent and brine with the Y-Grade NGL, the proppant, and at least one of nitrogen and carbon dioxide in the receiver-blender to form the stimulation fluid.

The method further comprises acquiring Y-Grade NGL from a wet gas stream, a fluid line, or storage tankers, and supplying the Y-Grade NGL to a Y-Grade NGL source that is in fluid communication with the receiver-blender.

The stimulation fluid includes a nitrogen concentration greater than about 50%, a carbon dioxide concentration greater than about 35%, or a combination of nitrogen and carbon dioxide concentration greater than about 50% so that the stimulation fluid is outside the flammability limit.

One embodiment of this disclosure comprises an emergency system having a header configured to supply a Y-Grade NGL stimulation fluid to a wellhead; a remote controlled emergency valve configured to close supply of the Y-Grade NGL stimulation fluid to the wellhead; and a spray bar header having a plurality of spray nozzles configured to spray carbon dioxide into the atmosphere adjacent to the header; or a vent line in communication with the header to vent the Y-Grade NGL stimulation fluid from the header; or a plurality of gas detectors configured to detect combustible gas from the header and in response actuation the remote controlled emergency valve to close supply of the Y-Grade NGL stimulation fluid to the wellhead.

BRIEF DESCRIPTION OF THE DRAWINGS

So that the manner in which the above recited features can be understood in detail, a more particular description of the embodiments briefly summarized above may be had by reference to the embodiments below, some of which are illustrated in the appended drawings. It is to be noted, however, that the appended drawings illustrate only typical embodiments and are therefore not to be considered limiting of its scope, for the embodiments may admit to other equally effective embodiments.

DETAILED DESCRIPTION

Figure 1:
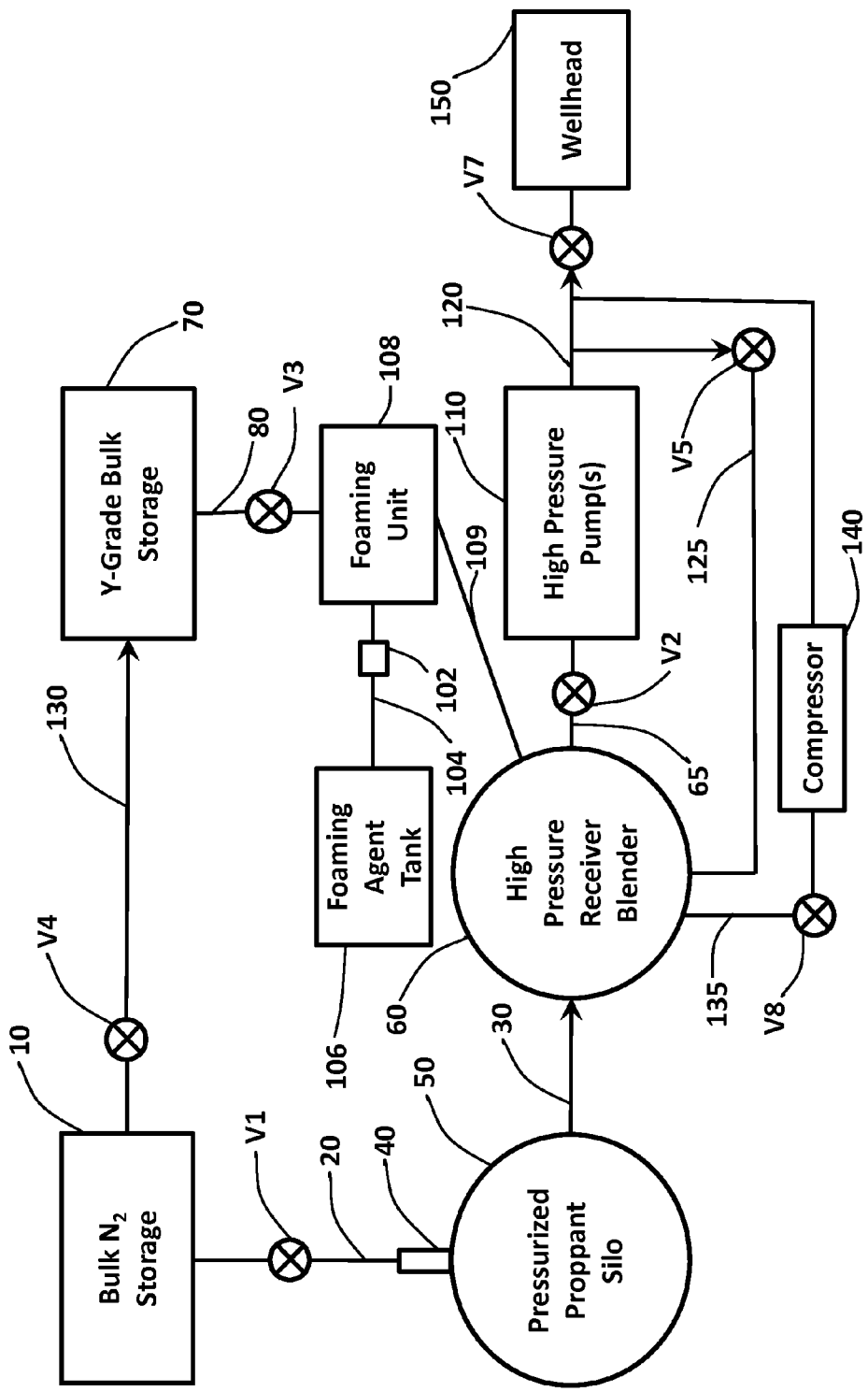
FIG. 1 shows a plan schematic of a foamed Y-Grade NGL fracturing system with a proppant and high pressure pumping system.

Y-Grade natural gas liquids (referred to herein as Y-Grade NGL) is an un-fractionated hydrocarbon mixture comprising ethane, propane, butane, isobutane, and pentane plus. Pentane plus comprises pentane, isopentane, and/or heavier weight hydrocarbons, for example hydrocarbon compounds containing at least one of C5 through C8+. Pentane plus may include natural gasoline.

Y-Grade NGL is the hydrocarbon by-product of a produced hydrocarbon stream after having the methane removed from the produced hydrocarbon stream, for example de-methanized via a high pressure separation unit. Typically, Y-Grade NGL is a by-product of de-methanized hydrocarbon streams that are produced from shale wells, and is transported to a centralized facility for fractionation into ethane, propane, butane, isobutane, and pentane. In its un-fractionated or natural state, Y-Grade NGL has no dedicated market or known use. Y-Grade NGL must undergo processing before its true value is proven. Y-Grade NGL differs from liquefied petroleum gas ("LPG"), which is comprised of only propane and butane.

According to one example, Y-Grade NGL comprises about 40%-45% ethane, about 25%-30% propane, about 5%-10% normal butane, about 5%-10% isobutane, and about 10%-15% pentane plus.

According to one example, Y-Grade NGL comprises about 40%-55% ethane, about 25%-30% propane, about 5%-10% normal butane, about 5%-10% isobutane, and about 10%-20% pentane plus.

According to one example, Y-Grade NGL comprises about 43% ethane, about 27% propane, about 7% normal butane, about 10% isobutane, and about 13% pentane plus at a maximum vapor pressure of about 600 psig at 100 degrees Fahrenheit per American Society for Testing and Materials (ASTM) according to the standard testing procedure D-6378 with methane, aromatics, and olefin maximums of 0.5% L.V. % per GPA 2177, 1.0 wt % of total stream per GPA 2186 and 1.0 L.V. % per GPA 2186, respectively.

According to one example, Y-Grade NGL comprises about 35%-55% ethane, about 20%-30% propane, about 10%-15% normal butane, about 4%-8% isobutane, and about 10%-15% pentane plus.

According to one example, Y-Grade NGL comprises about 28% ethane, about 42% propane, about 13% normal butane, about 7% isobutane, and about 10% pentane plus.

According to one example, Y-Grade NGL comprises about 48% ethane, about 31% propane, about 9% normal butane, about 5% isobutane, and about 7% pentane plus.

According to one example, Y-Grade NGL comprises about 58%-68% ethane, about 18%-24% propane, about 4%-7% normal butane, about 2%-3% isobutane, and about 5%-9% pentane plus.

According to one example, Y-Grade NGL comprises about 37%-43% ethane, about 28%-29% propane, about 7% normal butane, about 9%-11% isobutane, and about 13%-16% pentane plus.

According to one example, Y-Grade NGL comprises less than about 80% propane, butane, or a mixture of propane and butane.

According to one example, Y-Grade NGL comprises about 1%-80% propane, butane, or a mixture of propane and butane.

According to one example, Y-Grade NGL comprises greater than about 95% propane, butane, or a mixture of propane and butane.

According to one example, Y-Grade NGL comprises about 1%-80% ethane.

According to one example, Y-Grade NGL comprises about 1%-80% propane.

According to one example, Y-Grade NGL comprises about 1%-45% butane.

According to one example, Y-Grade NGL comprises about 1%-40% isobutane.

According to one example, Y-Grade NGL comprises about 1%-25% pentane plus.

According to one example, Y-Grade NGL comprises about 1%-60% hexanes.

According to one example, Y-Grade NGL comprises about 40%-55% of at least one hydrocarbon compound having two carbon elements ($C_2$).

According to one example, Y-Grade NGL comprises about 25%-50% of at least one hydrocarbon compound having three carbon elements ($C_3$).

According to one example, Y-Grade NGL comprises about 25%-50% of at least one hydrocarbon compound having four carbon elements ($C_4$).

According to one example, Y-Grade NGL comprises about 25%-50% of a combination of at least one hydrocarbon compound having three carbon elements ($C_3$) and at least one hydrocarbon compound having four carbon elements ($C_4$).

According to one example, Y-Grade NGL comprises about 10%-20% of at least one hydrocarbon compound having five carbon elements ($C_5$) or more.

According to one example, a Y-Grade NGL stimulation fluid comprises a proppant; ethane, wherein the ethane comprises about 30% to 80% of the fluid; propane, wherein the propane comprises about 15% to 50% of the fluid; butane, wherein the butane comprises about 15% to 45% of the fluid; isobutane, wherein the isobutane comprises about 15% to 40% of the fluid; and pentane plus, wherein the pentane plus comprises about 5% to 25% of the fluid.

According to one example, a Y-Grade stimulation fluid comprises about 30%-55% of at least one hydrocarbon compound having two carbon elements (C2); about 15%-50% of at least one hydrocarbon compound having three carbon elements (C3); about 15%-50% of at least one hydrocarbon compound having four carbon elements (C4); and about 5%-20% of at least one hydrocarbon compound having five carbon elements (C5) or more.

Y-Grade NGL may comprise one or more combinations, as a whole or in part, of the Y-Grade NGL examples and/or embodiments described herein.

One hydraulic fracture stimulation system as disclosed herein provides a method for fracturing conventional and unconventional hydrocarbon reservoirs by creating a Y-Grade NGL based foam that includes nitrogen or carbon dioxide combined with a foaming agent(s) and proppant to create a stimulation fluid. The stimulation fluid is non-damaging to wellbore formations, has minimal water content and chemical additions, is naturally occurring and locally available, cleans up rapidly, and completely recoverable with minimal proppant flow back.

FIG. 1 shows a plan schematic of a gelled Y-Grade NGL fracturing system that can be used alone or in combination with any of the embodiments described herein. The fracturing system consists of a nitrogen supply from a bulk storage tank(s) 10 that is transferred to an abrasion resistant venturi eductor 40 via a transfer line 20 and an automated control valve V1, and to a Y-Grade NGL bulk storage tank(s) 70 as a blanketing gas via a line 130 that is controlled by an automated valve V4. Proppant from a pressurized silo 50 is fed into the abrasion resistant venturi eductor 40 and is transferred via a line 30 to a high pressure receiver blender 60.

Y-Grade NGL from the bulk storage tank 70 is transferred to a foaming unit 108 via a line 80 that is controlled by an automated valve V3. A foaming agent from a foaming agent tank(s) 106 is transferred into the foaming unit 108 via a line 104 by a dosing pump 102. The Y-Grade NGL foam from the foaming unit 108 is transferred to the high pressure receiver blender 60 along with proppant from the abrasion resistant venturi eductor 40 via a line 109.

The Y-Grade NGL foam-proppant mixture from the high pressure receiver blender 60 is transferred through a line 65 by the suction of a high pressure pump(s) 110. The line 65 is controlled by an automated valve V2. High pressure Y-Grade NGL proppant-mixture is discharged from the high pressure pump 110 through a line 120 for injection as a stimulation fluid into a wellhead 150, and through a recycle line 125, which is controlled by an automated valve V5 back to the high pressure receiver blender 60 for mixing. Pressure within the high pressure receiver blender 60 is regulated via a line 135 by an automated valve V8 via the suction of a compressor 140, which is discharged to the wellhead 150 via the line 120 and an automated emergency shut-in valve V7.

Figure 2:
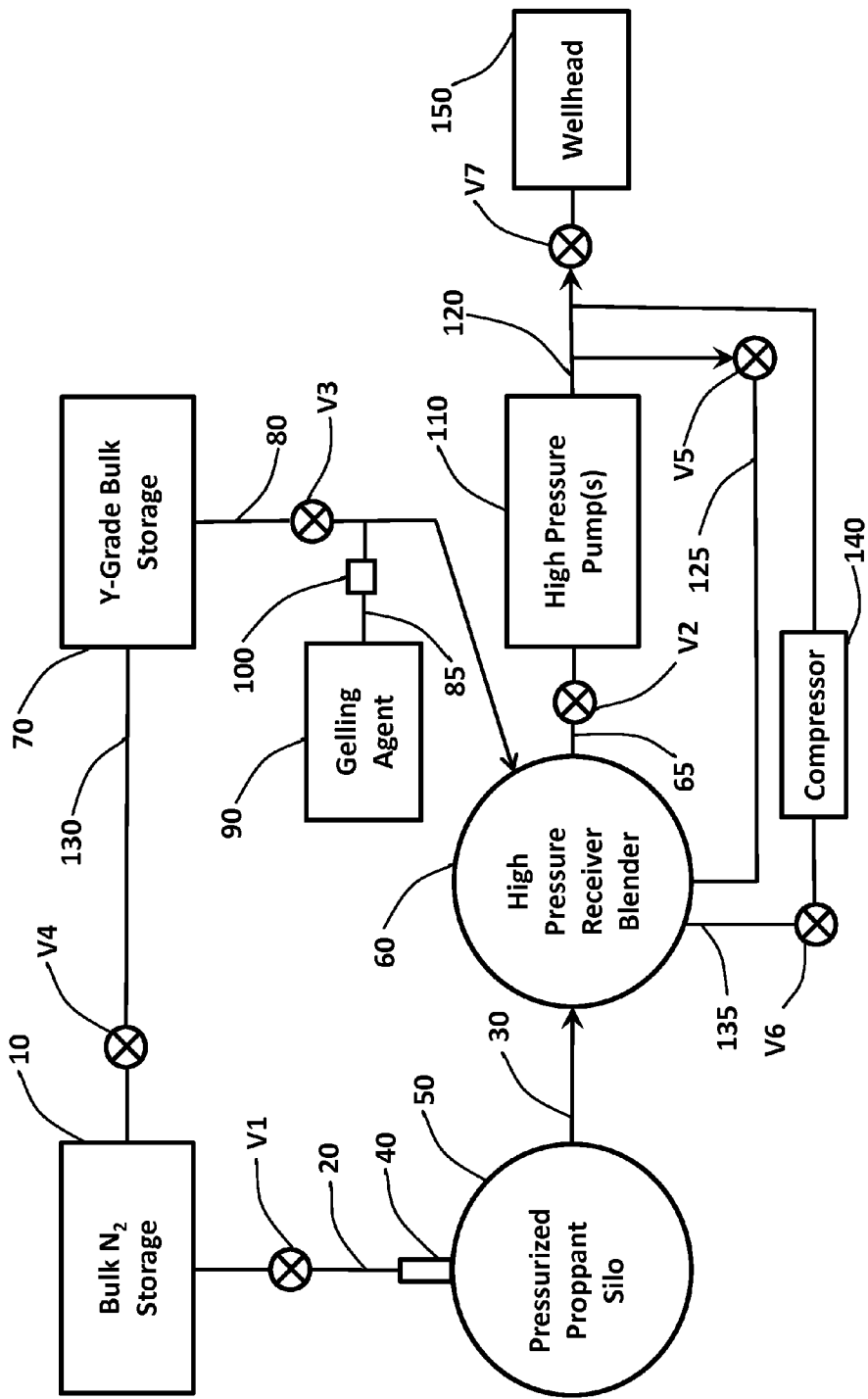
FIG. 2 shows a plan schematic of a gelled Y-Grade NGL fracturing system with a proppant and high pressure pumping system.

FIG. 2 shows a plan schematic of a foamed Y-Grade NGL fracturing system that can be used alone or in combination with any of the embodiments described herein. The fracturing system consists of a nitrogen supply from a bulk storage tank(s) 10 that is transferred to an abrasion resistant venturi eductor 40 via a transfer line 20 and an automated control valve V1, and to a Y-Grade NGL bulk storage tank(s) 70 as a blanketing gas via a line 130 that is controlled by an automated valve V4. Proppant from a pressurized silo 50 is fed into the abrasion resistant venturi eductor 40 and is transferred via a line 30 to a high pressure receiver blender 60.

Y-Grade NGL from the bulk storage tank 70 is transferred to the high pressure receiver blender 60 via a line 80 that is controlled by an automated valve V3. A gelling agent from a gelling agent tank(s) 90 is transferred into the line 80 via a dosing pump 100 through a line 85. The gelled Y-Grade NGL proppant mixture from the high pressure receiver blender 60 is transferred by the suction of a high pressure pump(s) 110 through a line 65 that is controlled by an automated valve V2. High pressure Y-Grade NGL proppant mixture is discharged from the high pressure pump 110 through a line 120 for injection as a stimulation fluid into a wellhead 150, and through a recycle line 125, which is controlled by an automated valve V5 back to the high pressure receiver blender 60 for mixing. Pressure within the high pressure receiver blender 60 is regulated via a line 135 by an automated valve V6 via the suction of a compressor 140, which is discharged to the wellhead 150 via the line 120 and an automated emergency shut-in valve V7.

Figure 3:
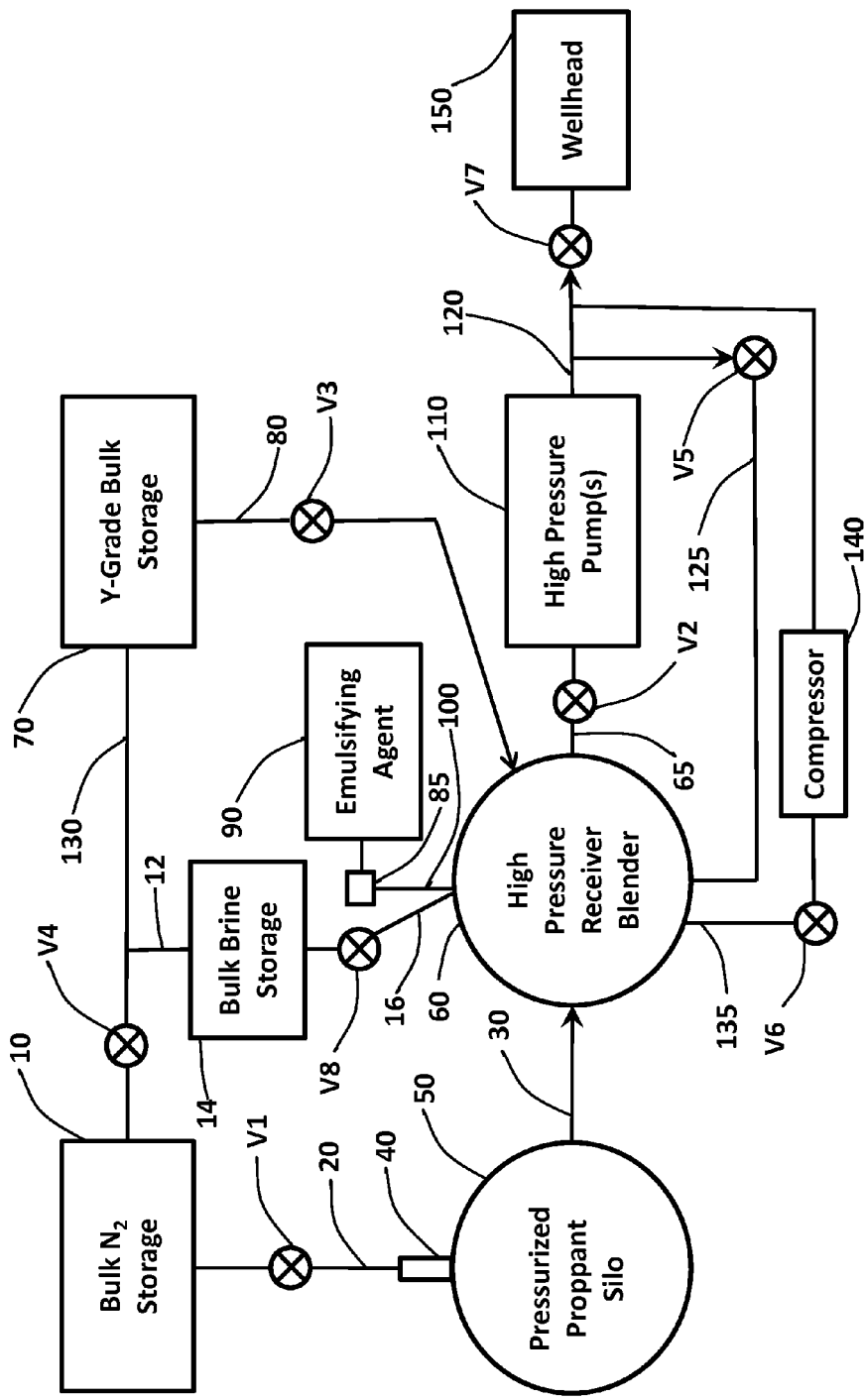
FIG. 3 shows a plan schematic of an emulsified Y-Grade NGL fracturing system with a proppant and high pressure pumping system.

FIG. 3 shows a plan schematic of an emulsified Y-Grade NGL fracturing system that can be used alone or in combination with any of the embodiments described herein. The fracturing system consists of a nitrogen supply from a bulk storage tank(s) 10 that is transferred to an abrasion resistant venturi eductor 40 via a transfer line 20 and an automated control valve V1; to a Y-Grade NGL bulk storage tank(s) 70 as a blanketing gas via a line 130 that is controlled by an automated valve V4; and to a bulk brine storage tank(s) 14 via a line 12 that is also controlled by the automated valve V4. Proppant from a pressurized silo 50 is fed into the abrasion resistant venturi eductor 40 and is transferred via a line 30 to a high pressure receiver blender 60. Y-Grade NGL from the bulk storage tank 70 is transferred to the high pressure receiver blender 60 via a line 80 that is controlled by an automated valve V3.

An emulsifying agent from an emulsifying agent tank 90 is transferred to the high pressure receiver blender 60 via a dosing pump 85 via a line 100. Brine from the bulk brine storage tank 14 is transferred to the high pressure receiver blender 60 via a line 16 that is controlled by an automated valve V8. The Y-Grade NGL emulsion proppant mixture from the high pressure receiver blender 60 is transferred by the suction of a high pressure pump(s) 110 through a line 65 that is controlled by an automated valve V2. High pressure Y-Grade NGL proppant mixture is discharged from the high pressure pump 110 through a line 120 for injection as a stimulation fluid into a wellhead 150, and through a recycle line 125 that is controlled by an automated valve V5 to the high pressure receiver blender 60 for mixing. Pressure within the high pressure receiver blender 60 is regulated via a line 135 by an automated valve V6 via the suction of a compressor 140, which is discharged to the wellhead 150 via the line 120 and an automated emergency shut-in valve V7.

In any of the embodiments shown in FIGS. 2-3, the Y-Grade NGL storage tanks 70 may comprises of onsite Y-Grade NGL pressurized storage vessels that are supplied from a regional Y-Grade gathering pipeline, a regional gas splitter, or a gas processing facility via tanker trucks. In any of the embodiments shown in FIGS. 2-3, the proppant can be is temporally stored in the pressurized proppant silo 50 and pneumatically conveyed to the receiver-blender 60 using nitrogen or carbon dioxide.

Figure 4:
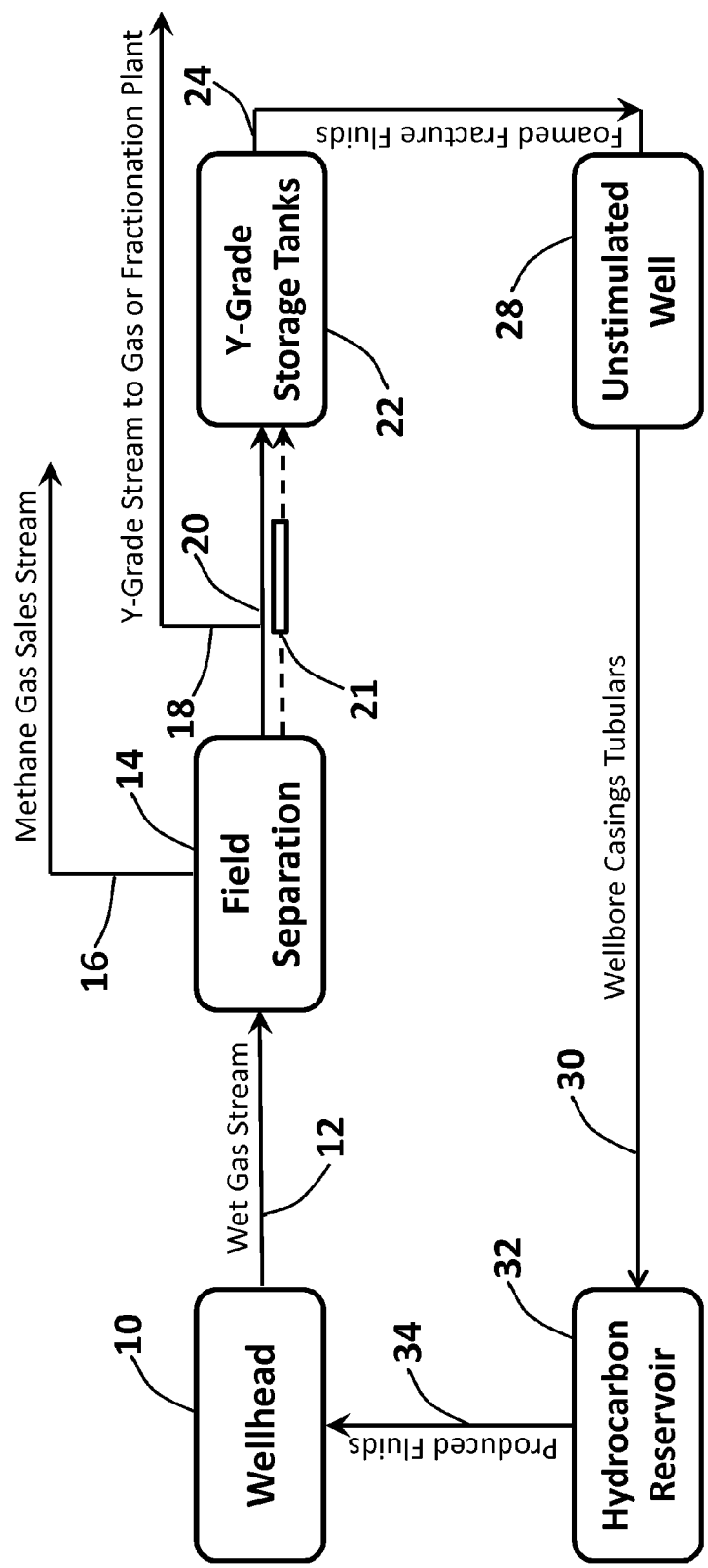
FIG. 4 shows a plan schematic of a Y-Grade NGL utilization and recovery process.

FIG. 4 shows a plan schematic of a Y-Grade NGL utilization and recovery system that can be used alone or in combination with any of the embodiments described herein. Produced fluids from a conventional or unconventional hydrocarbon reservoir 32 are conveyed to the surface through a series of downhole casing and/or tubulars 34 to a surface wellhead 10 of a producing well that has been previously fracture stimulated. The "wet gas stream" from the wellhead 10 is transferred to a field high pressure separation unit(s) 14 via a line 12 where methane and a fraction of ethane gas is recovered and sold into a high pressure gas sales line 16. The Y-Grade NGL recovered from the field high pressure separation units 14 as a liquid phase is transferred via a high pressure sales line 18 for processing and fractionation, and/or to a high pressure Y-Grade NGL bulk storage tank(s) 22 via a line 20 where feasible or otherwise by a tanker(s) 21. Y-Grade NGL in the high pressure Y-Grade NGL bulk storage tank 22 is foamed and injected into a second unstimulated well 28 via a high pressure surface line 24, and then conveyed to the reservoir 32 via a series of downhole casing and/or tubulars 30.

Figure 5A:
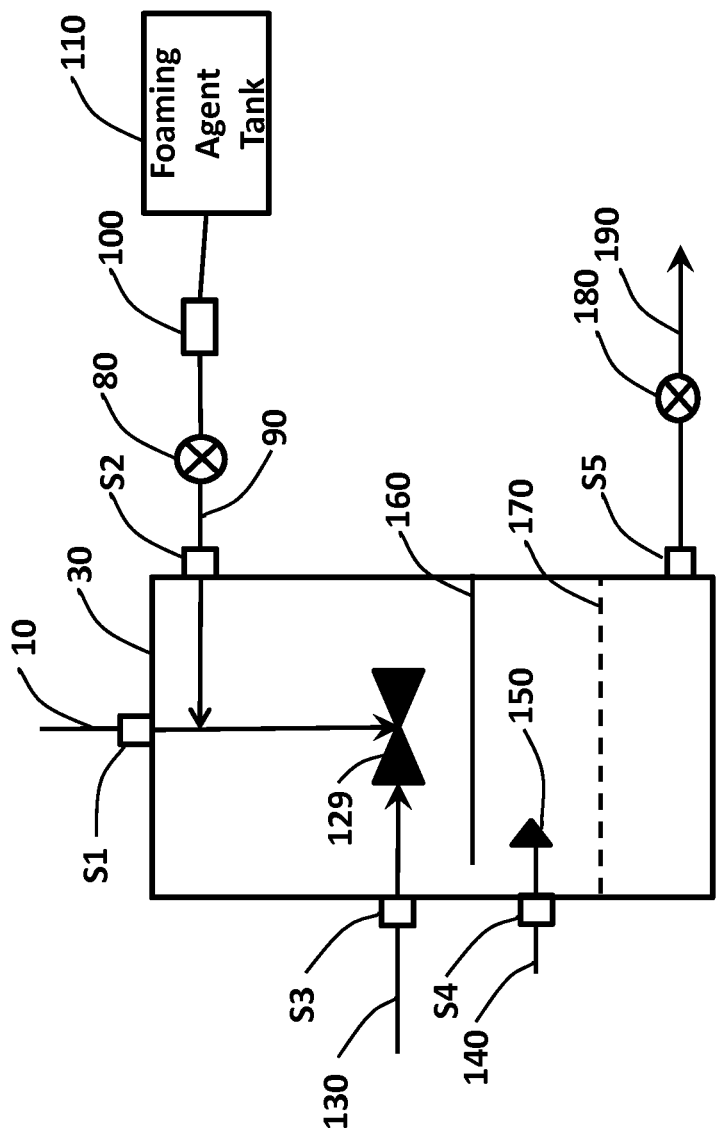
FIG. 5A shows a vertical section of a high pressure foaming unit for use with Y-Grade NGL and nitrogen or carbon dioxide systems.

FIG. 5A shows a vertical section of a high pressure foaming unit 30 that can be used alone or in combination with any of the embodiments described herein. High pressure Y-Grade NGL flowing in a line 10 penetrates the wall of the high pressure foaming unit 30 through a seal assembly S1. A foaming agent from a foaming agent tank(s) 110 is injected into a line 90 penetrating the wall of the foaming unit 30 though a seal assembly S2 and delivered by a dosing pump 100 that is controlled by an automated valve 80.

The Y-Grade NGL and foaming agent mixture is delivered by the line 10 to a venturi eductor 129 where it is foamed with nitrogen that is delivered to the venturi eductor 129 by a line 130 penetrating the wall of the foaming unit 30 through a seal assembly S3. A foam spray exiting the venturi eductor 129 is diverted by a plate 160 to a high frequency ultrasonic sonde(s) 150 that is powered by a line 140 penetrating the wall of the foaming unit 30 through a seal assembly S4, thereby creating micro-bubbles. The foam passes through a micro screen 170 that removes larger bubbles and exits the foaming unit 30 through a line 190, which penetrates the wall of the foaming unit 30 through a seal assembly S5 and is controlled by an automated valve 180.

Figure 5B:
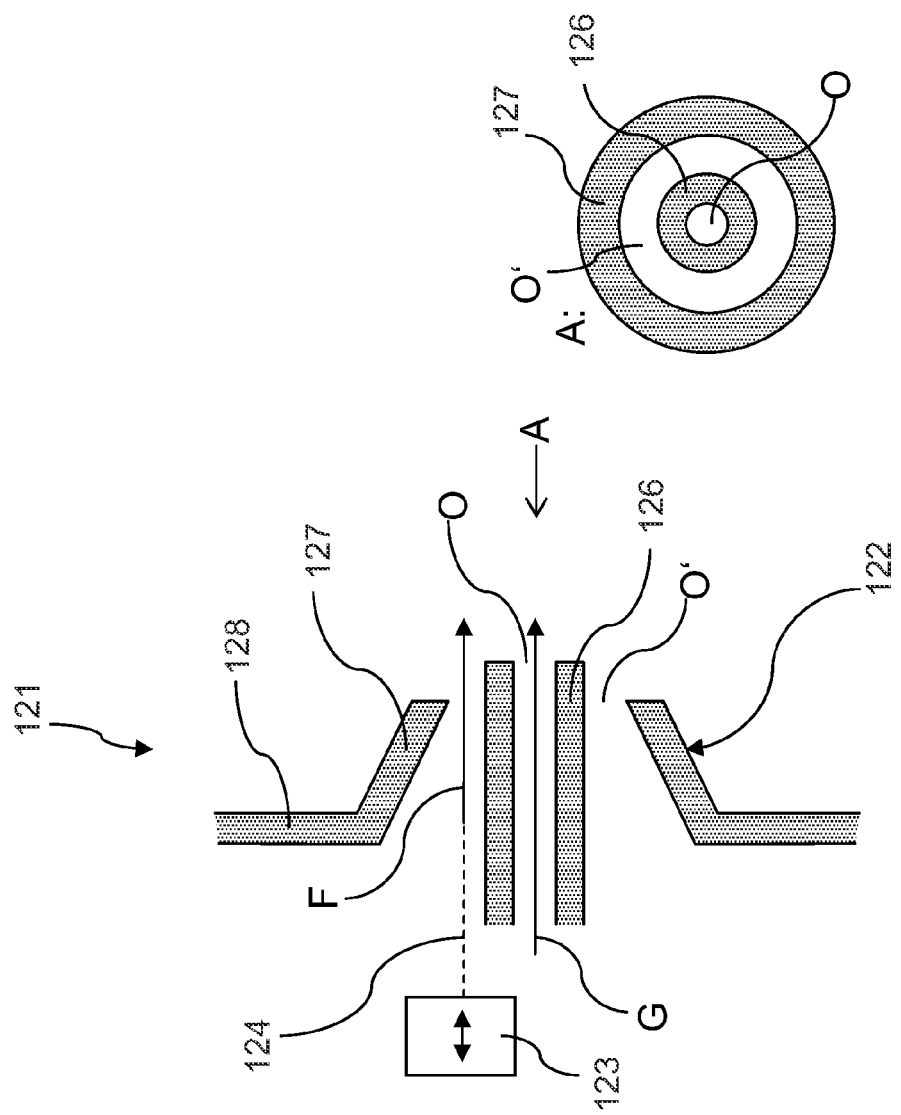
FIG. 5B shows a nozzle assembly for use with Y-Grade NGL foam and nitrogen and/or carbon dioxide systems.

In one embodiment, the Y-Grade NGL and foaming agent mixture is pumped through a vibrating nozzle system, such as the venturi eductor 129 illustrated in FIG. 5A and/or a nozzle system 121 illustrated in FIG. 5B, at ultrasonic frequency, wherein upon exiting, the mixture breaks up into uniform droplets. Vibration can be induced via an elastic membrane just before the mixture exits the nozzles. The amplitude and frequency of the nozzle oscillation can be held constant to attain a monodisperse droplet size distribution. The droplets can be directed at an angle into a tangential fluid flow to prevent rupturing of the droplets when exiting, such as through the line 190 shown in FIG. 5.

FIG. 5B shows a side view and a top view (when viewing in the direction of reference arrow "A") of the nozzle system 121 according to one embodiment. The nozzle system 121 comprises a co-axial nozzle 122 having an inner nozzle 126 surrounded by an outer nozzle 127, and a nozzle plate 128 configured to support the inner and/or outer nozzles 126, 127. The inner nozzle 126 has an opening O and the outer nozzle has an opening O', through which fluids (liquids identified by reference arrow "F", and/or gases identified by reference arrow "G") flow. The co-axial nozzle 122 can be assembled so that gas flows through the inner nozzle 126 while liquid flows through the outer nozzle 127. A vibration generator 123, preferably a high frequency ultrasonic type, is configured to vibrate the co-axial nozzle 122 via a coupler 124. In one embodiment, the venturi eductor 129 illustrated in FIG. 5A may comprise the nozzle system 121 illustrated in FIG. 5B.

In the embodiment illustrated in FIG. 5B, (solid) proppant can mixed with the Y-Grade NGL foam after the foam generation stage to avoid plugging and/or abrasion of the inner and outer nozzles 126, 127. The Y-Grade NGL foam will be generated under pressure. The vibration generated by the vibration generator 123 is preferably generated in a specific direction, for example in the same or counter direction of the fluid flow through the inner and outer nozzles 126, 127 such that the fluid (liquids and/or gases) itself oscillates in the same orientation. The applied oscillating frequency is between about 16 kHz and about 200 MHz; between about 16 kHz and about 100 kHz; between about 16 kHz and about 50 kHz; and between about 16 kHz and about 30 kHz. The use of the nozzle system 121 results in a very narrow, monomodal bubble size distribution. Although only two nozzles are shown, the nozzle system 121 can comprise an array of inner and/or outer nozzles coupled to the nozzle plate 128. The narrow bubble size distribution leads to an optimized proppant carrying capacity.

Figure 6:
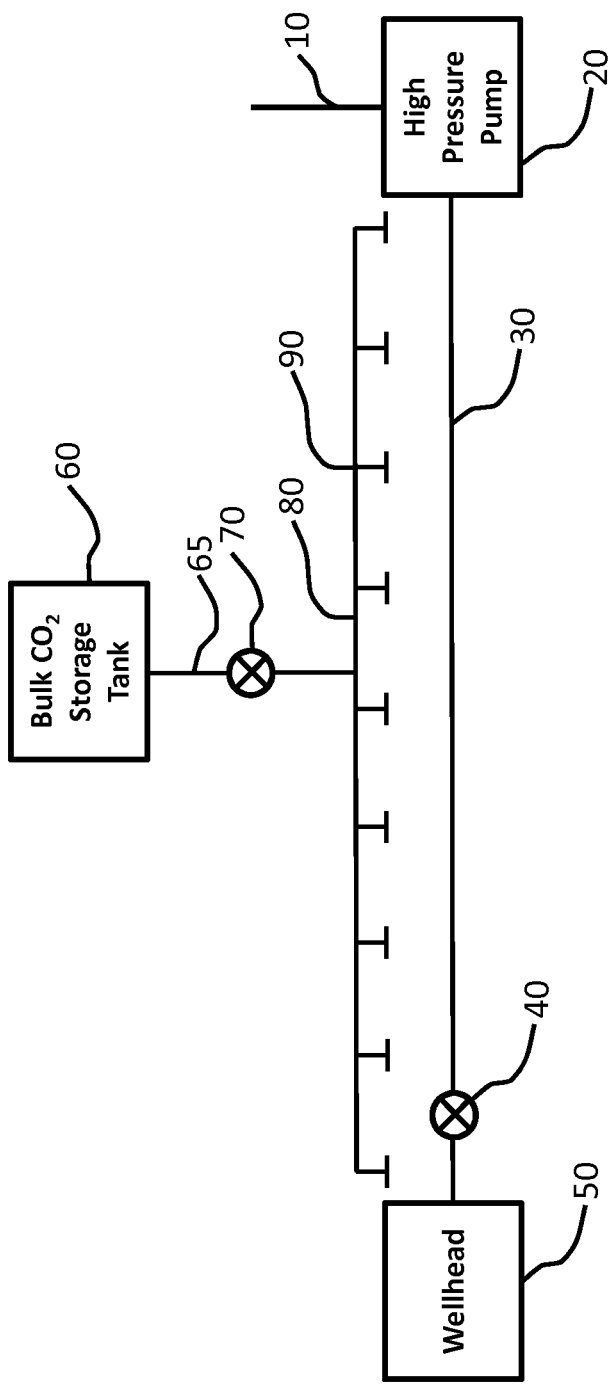
FIG. 6 shows a plan schematic of an emergency carbon dioxide flooding system that can be actuated via remote control for use with a Y-Grade NGL foam or gelled system.

FIG. 6 shows a plan schematic of an emergency carbon dioxide or nitrogen flooding system that can be used alone or in combination with any of the embodiments described herein. The emergency carbon dioxide or nitrogen flooding system can be actuated via a remote control and/or used with the Y-Grade NGL foam or gelled systems as described herein. A high pressure pump suction line 10 delivers a Y-Grade NGL stimulation fluid to a high pressure pump(s) 20. The high pressure Y-Grade NGL stimulation fluid is transferred to a wellhead 50 via a high pressure header 30 and a remote controlled emergency valve 40. In an emergency situation, the high pressure pump 20 is shut down and the remote controlled emergency valve 40 is remotely closed. A remote controlled valve 70 opens to deliver carbon dioxide or nitrogen from a storage tank(s) 60 via a line 65 to a spray bar header 80, which carbon dioxide or nitrogen is then discharged into the atmosphere through a series a nozzles 90.

Figure 7:
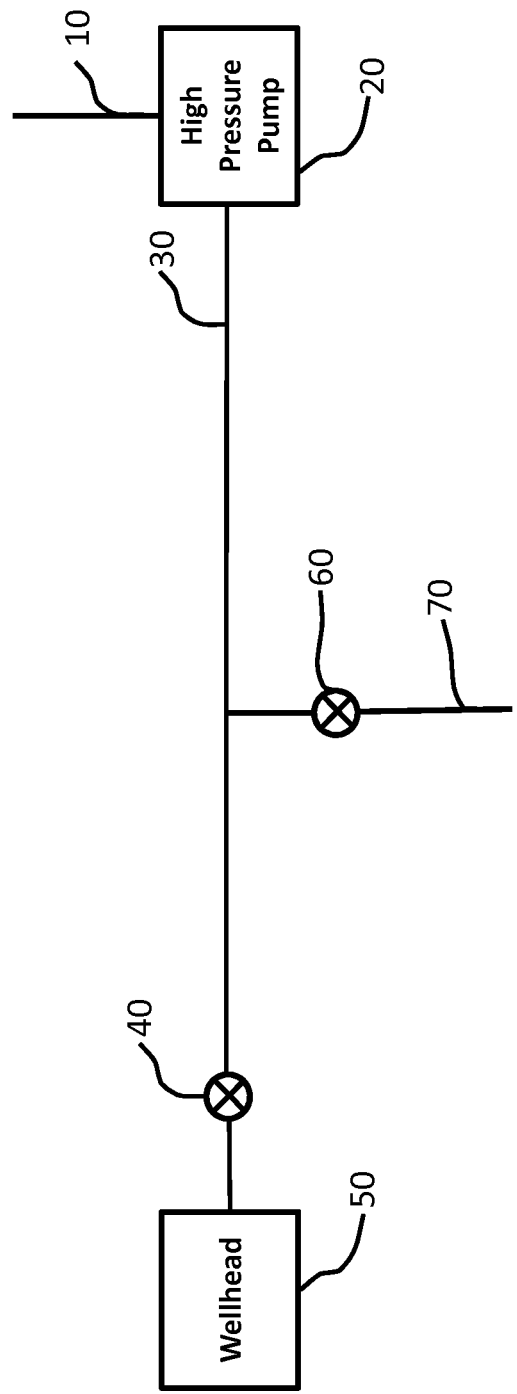
FIG. 7 shows a plan schematic of an emergency blow down system that can be remotely activated for use with a Y-Grade NGL foam or gelled system.

FIG. 7 shows a plan schematic of an emergency blow-down system that can be used alone or in combination with any of the embodiments described herein. The emergency blow-down system can be remotely activated and/or used with the Y-Grade NGL foam or gelled systems as described herein. A high pressure pump suction line 10 delivers a Y-Grade NGL stimulation fluid to a high pressure pump(s) 20. The high pressure Y-Grade NGL stimulation fluid is transferred to a wellhead 50 via a high pressure header 30 and a remote controlled emergency valve 40. In an emergency situation, the high pressure pump 20 is shut down and the remote controlled emergency valve 40 is remotely closed. The high pressure Y-Grade NGL trapped in the header 30 is released via a vent or blow line 70 by opening a remote controlled valve 60.

Figure 8:
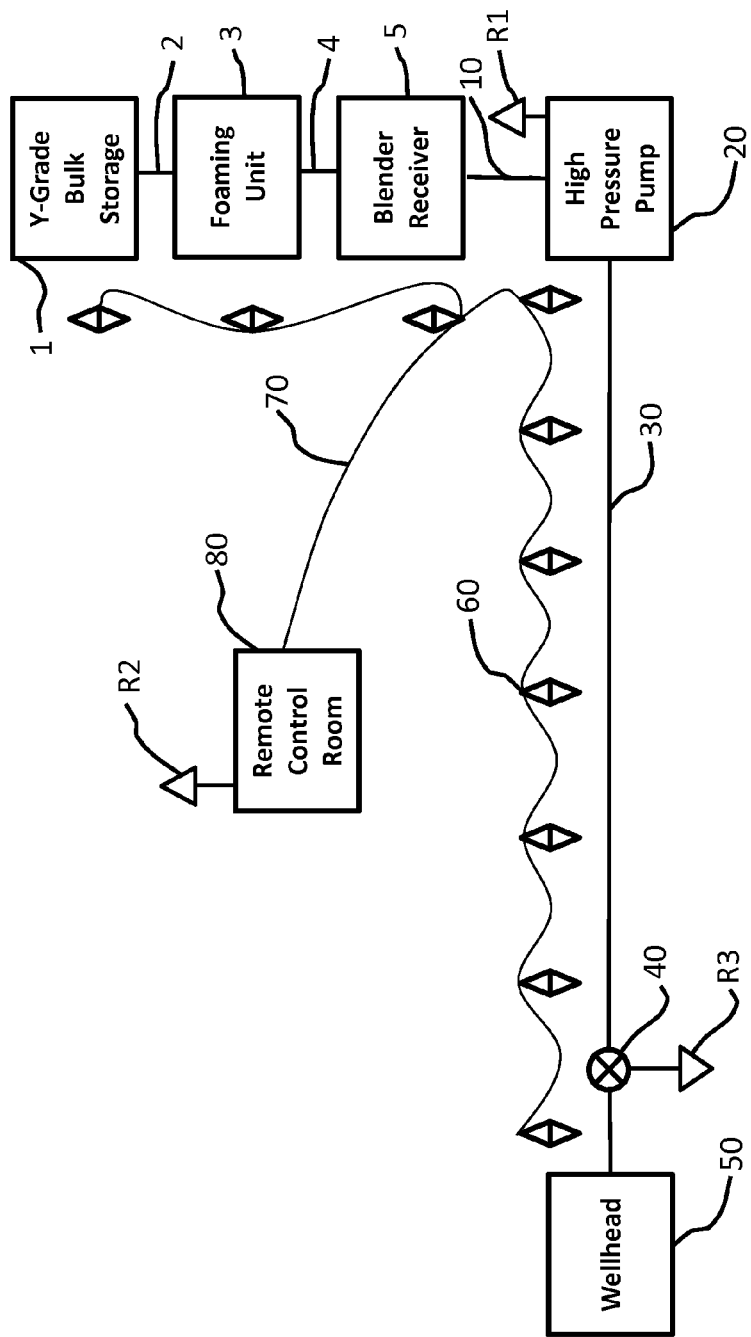
FIG. 8 shows a plan schematic of an emergency shutdown system utilizing a combustible gas detection system to shut down high pressure pumping unit(s) and close-in remotely actuated shut-in valves for use with a Y-Grade NGL foam or gelled system.

FIG. 8 shows a plan schematic of an emergency shutdown system that can be used alone or in combination with any of the embodiments described herein. The emergency shutdown system utilizes a combustible gas detection system to shut down a high pressure pumping unit and close-in a remote controlled shut-in valve, which can be used with the Y-Grade NGL foam or gelled systems as described herein. A bulk Y-Grade NGL storage 1 is connected to a high pressure pump suction line 10 via a line 2, which is connected to a foaming unit 3, which is connected to a blender receiver 5 via a line 4. The blender receiver 5 is connected to a high pressure pump(s) 20 via the high pressure suction line 10. A high pressure Y-Grade NGL stimulation fluid is transferred to a wellhead 50 via a high pressure header 30 and a remote controlled emergency valve 40. When a combustible gas is detected by one or more gas detectors 60 that are in communication with a control room 80 via a conductor cable 70, the high pressure pump 20 is shut down and the remote controlled emergency valve 40 is closed by remote control via a remote radio signal from transmitters R1, R2, and R3 from the control room 80.

Figure 9:
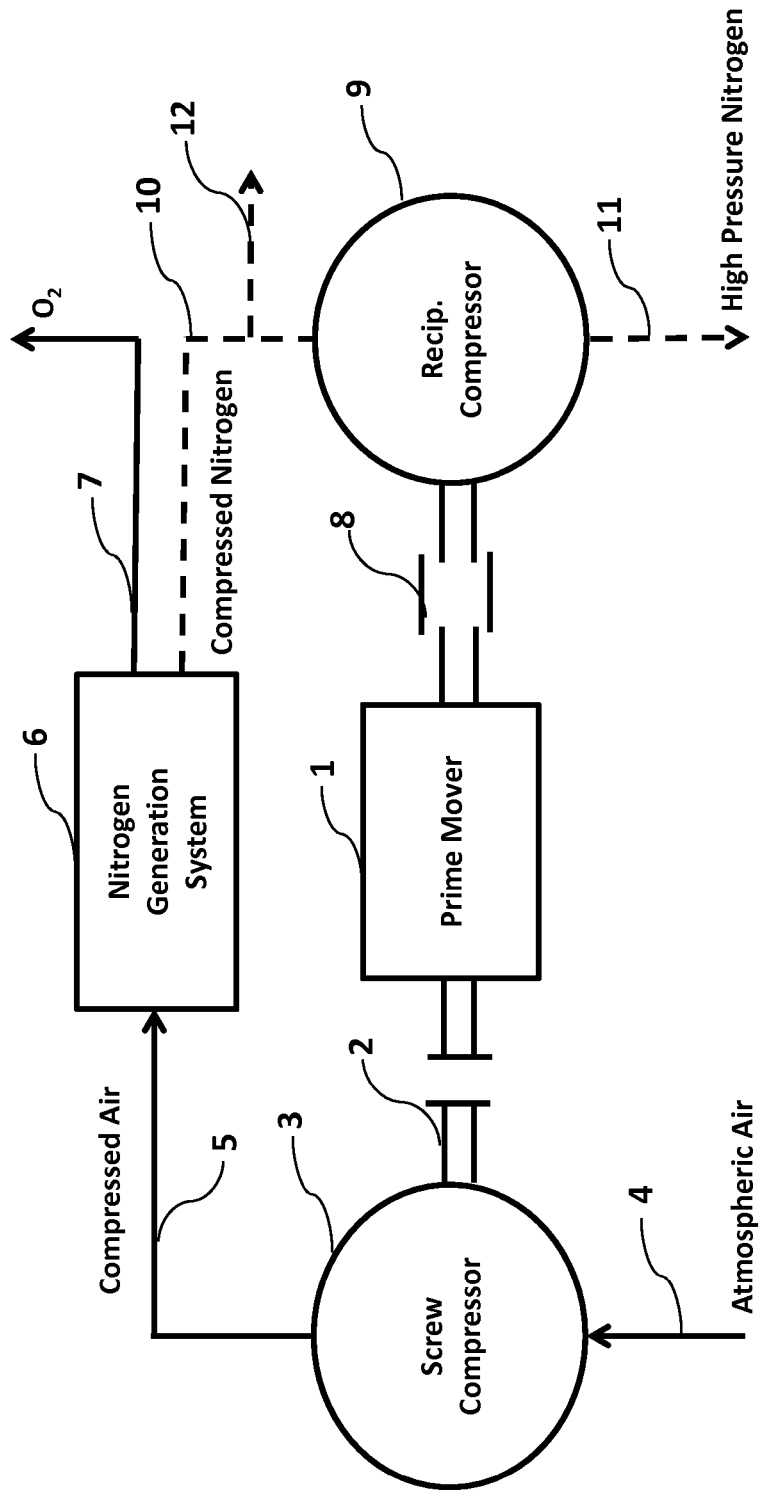
FIG. 9 shows a plan schematic of field transportable membrane generation equipment to separate nitrogen from air for use with a Y-Grade NGL foam or gelled system

FIG. 9 shows a plan schematic of field transportable membrane generation equipment that can be used alone or in combination with any of the embodiments described herein. The field transportable membrane generation equipment can be used to separate nitrogen from air for use with the Y-Grade NGL foam or gelled systems as described herein. A membrane generating unit consists of a prime mover 1 that is either electrically or diesel driven. The prime mover 1 is attached by a permanent coupling drive shaft 2 to a screw compressor 3. Atmospheric air travels into a suction of the screw compressor 3 via a line 4 and is compressed up to about 15 bars.

The compressed air travels to an inlet of a membrane 6 via a line 5, where the compressed air is dried and filtered and then moved through a series of porous or nonporous polymer membranes where air is separated into permeate oxygen and about 94% to about 99% quality nitrogen. The permeate oxygen can be discharged into the atmosphere via a source discharge line 7. The nitrogen is routed to an intake of a reciprocating compressor 9 via a line 10. The reciprocating compressor 9 is connected to the prime mover 1 by a dis-connectable coupling 8. The nitrogen is compressed to a desired pressure and then routed to a high pressure pipeline 11 for distribution. A low pressure nitrogen source for other applications is provided for by a line 12 that is connected to the line 10.

Figure 10:
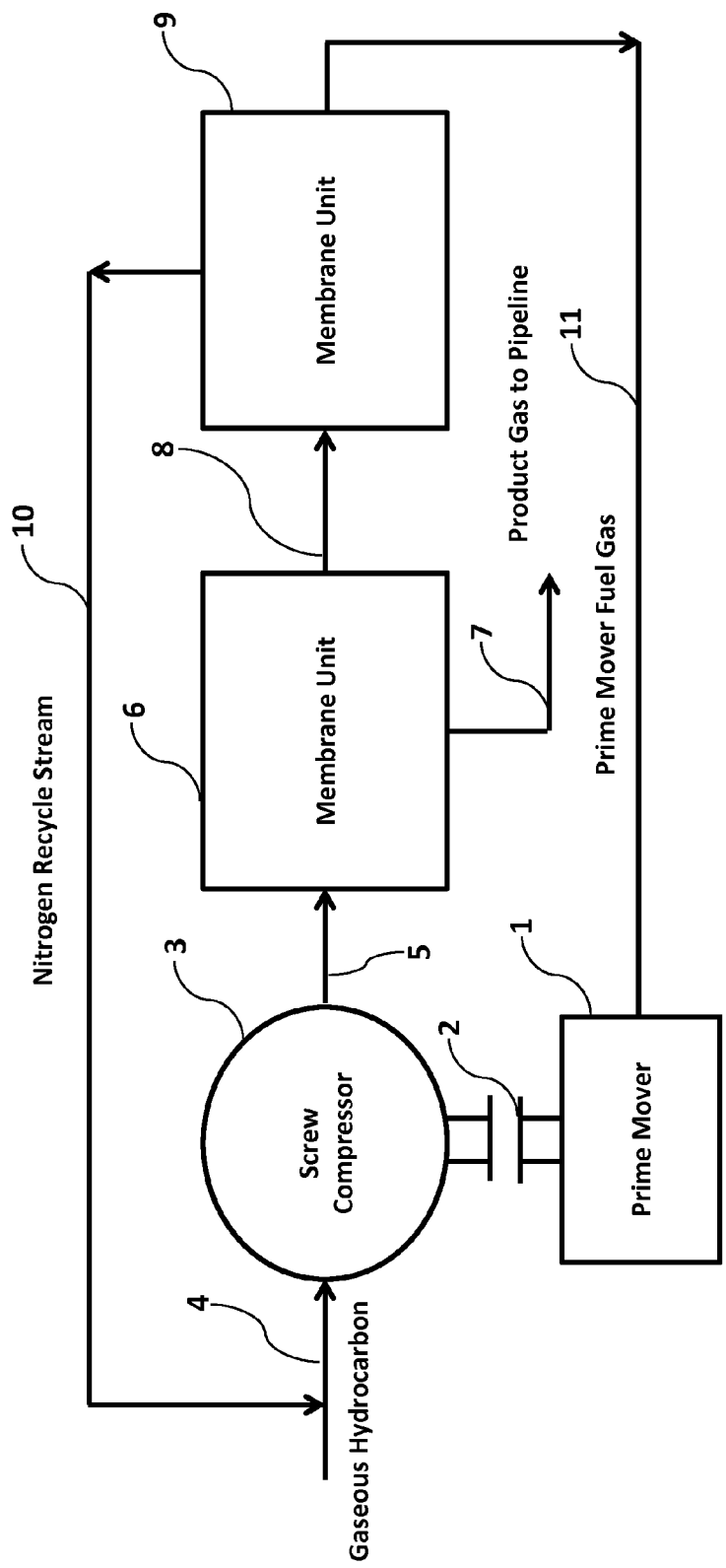
FIG. 10 shows a plan schematic of a surface process flow assembly to reject nitrogen from a produced gaseous hydrocarbon stream from surface gas-liquid separation processes for use with a Y-Grade NGL foam or gelled system.

FIG. 10 shows a plan schematic of an above ground field deployed nitrogen rejection system that can be used alone or in combination with any of the embodiments described herein. The nitrogen rejection system can be used for removing nitrogen from a gaseous hydrocarbon stream(s) that may have become contaminated as a result of nitrogen injection into a hydrocarbon reservoir. The nitrogen rejection system consists of a prime mover 1 that is driven by a recycle gas permeate. The prime mover 1 is attached by a permanent coupling drive shaft 2 to a screw compressor 3. The inlet of the screw compressor 3 is supplied by a nitrogen contaminated gaseous hydrocarbon stream 4 from a hydrocarbon reservoir. The pressurized hydrocarbon stream 5 feeds into a first porous or nonporous polymer membrane unit 6 where it is dried, filtered, and separated into a pipeline sales quality gaseous hydrocarbon permeate 7, as well as a nitrogen rich residue gas 8 that is fed into a second porous or nonporous polymer membrane unit 9. The second porous or nonporous polymer membrane unit 9 separates the nitrogen rich residue gas 8 into a nitrogen depleted permeate 10, which is passed back into the initial nitrogen contaminated gaseous hydrocarbon stream 4, and a rich hydrocarbon residue gas 11 that is used as fuel gas supplied to the prime mover 1.

The following example compares Y-Grade NGL based stimulation fluid costs versus Water based stimulation fluid costs:

A hydrocarbon reservoir is being considered for development under two scenarios: first, a single stage 300,000 gallon conventional water-based fracture stimulation on an unconventional horizontal well; second, a single stage 80% quality foamed Y-Grade NGL fracture stimulation using membrane generated nitrogen on the same unconventional horizontal well. Proppant, fuel, and amortized equipment costs have been eliminated from both cases. Typical pumping costs have been assumed for the conventional stimulation with a 10% premium including membrane generation costs (excluding fuel and equipment amortization costs) have been assumed for the Y-Grade NGL stimulation. Typical stimulation fluid costs and water handling costs have been assumed. Y-Grade NGL chemical costs for foaming and gelling is assumed to be $15,000. A comparison of the two scenarios is presented in Table 1.

|  | Conventional Water-Based Cost per Stage | Foamed Y-Grade NGL Cost per Stage |
|---|---|---|
| High Pressure Pumping Costs | $100,000 | $121,000 |
| Frac Fluid Chemical Costs | $20,000 | $15,000 |
| Y-Grade NGL Costs | N/A | $65,000 |
| Y-Grade NGL Reclamation | N/A | ($65,000) |
| Water Handling Costs | $20,000 | N/A |
| Total Costs | $150,000 | $136,000 |

A Y-Grade NGL stimulation fluid may comprise a proppant; ethane, wherein the ethane comprises about 0% to 80% of the fluid; propane, wherein the propane comprises about 0% to 80% of the fluid; butane, wherein the butane comprises about 0% to 45% of the fluid; isobutane, wherein the isobutane comprises about 0% to 40% of the fluid; and pentane plus, wherein the pentane plus comprises about 0% to 25% of the fluid. The fluid further comprises at least one of carbon dioxide and nitrogen.

A Y-Grade NGL stimulation fluid may comprise less than about 80% propane, butane, or a mixture of propane and butane, or greater than about 95% propane, butane, or a mixture of propane and butane.

A Y-Grade stimulation fluid may comprise about 40%-55% of at least one hydrocarbon compound having two carbon elements (C2); about 25%-50% of at least one hydrocarbon compound having three carbon elements (C3); about 25%-50% of at least one hydrocarbon compound having four carbon elements (C4); and about 10%-20% of at least one hydrocarbon compound having five carbon elements (C5) or more.

A system may comprise a nitrogen and/or carbon dioxide source, a Y-Grade NGL supply source, a foaming unit, a proppant supply source, a foaming agent supply source, a high pressure receiver-blender, and a pressure regulation compressor, wherein the foaming agent supply comprises at least one of a foaming agent, a foam stabilizer, a co-surfactant, and a co-solvent.

A method may comprise supplying nitrogen from a nitrogen supply source; adding Y-Grade NGL from a Y-Grade NGL source and a foaming agent from a foaming agent source to the nitrogen; supplying proppant from a proppant supply source; blending the Y-Grade NGL, the foaming agent, optionally a foam stabilizer, and the proppant in a high pressure receiver blender to form a stimulation fluid while regulating pressure within the high pressure receiver blender; and pumping the stimulation fluid into a wellhead and/or a hydrocarbon bearing reservoir using a high pressure pumping unit.

A method may comprise generating a foam by mixing a Y-Grade NGL with a foaming agent, optionally a foam stabilizer, and optionally water, using a foam generator with nitrogen or carbon dioxide, and then mixing the foam in a high pressure blender with proppant to form a stimulation fluid, and then pumping the stimulation fluid into a wellhead and/or a hydrocarbon bearing reservoir using a high pressure pumping unit. The foam generator includes ultrasonic vibration activated nozzles configured to generate the foam and/or to optimize a bubble size and/or distribution of the foam, and the method may further comprise adjusting the pressure of the foam before and after flowing through the nozzles.

A system may comprise a nitrogen source, a bulk nitrogen source, a bulk Y-Grade NGL supply source, a proppant supply source, a gelling agent supply source, a high pressure receiver-blender, and a pressure regulation compressor.

A method may comprise supplying nitrogen from a nitrogen supply source; adding Y-Grade NGL from a Y-Grade NGL source to the nitrogen; adding a gellant to the Y-Grade NGL; supplying proppant from a proppant supply source; blending the gellant, the Y-Grade NGL, and the proppant in a high pressure receiver blender to form a stimulation fluid while regulating pressure within the high pressure receiver blender; and pumping the stimulation fluid into a wellhead and/or a hydrocarbon bearing reservoir using a high pressure pumping unit. The gelled Y-Grade NGL stimulation fluid is energized with either high pressure nitrogen or carbon dioxide prior to being injected into the hydrocarbon bearing reservoir.

A system may comprise inertization of proppant by carbon dioxide or nitrogen to avoid contamination with oxygen, an oxygen detector, and a carbon dioxide or nitrogen counter stream when filling proppant into storage facilities.

A system may comprise one or more parts of system equipment and/or the entire system contained in a container or positioned in a closed chamber and blanketed by carbon dioxide and/or nitrogen.

A system may comprise a gas detection system combined with an automated carbon dioxide gas, carbon dioxide based foam, nitrogen gas, nitrogen based foam, and/or water based foam flooding system.

A system may comprise a mobile nitrogen and/or carbon dioxide recovery unit to recover nitrogen and/or carbon dioxide from a produced hydrocarbon stream.

A system may comprise a nitrogen source, a Y-Grade NGL supply source, an emulsifying agent source, a high pressure receiver-blender, and a pressure regulation compressor.

A method may comprise supplying nitrogen from a nitrogen supply source; adding Y-Grade NGL from the Y-Grade NGL source and an emulsifying agent from an emulsifying agent source to the nitrogen; supplying proppant from a proppant supply source; blending the Y-Grade NGL, the emulsifying agent, and the proppant in a high pressure receiver blender to form a stimulation fluid while regulating pressure within the high pressure receiver blender; and pumping the stimulation fluid into a wellhead and/or a hydrocarbon bearing reservoir using a high pressure pumping unit. The emulsified Y-Grade NGL stimulation fluid is energized with either high pressure nitrogen or carbon dioxide prior to being injected into the hydrocarbon bearing reservoir.

A method may comprise acquiring and recovering Y-Grade NGL from a field separation, splitter facility or gas processing plant; transporting the Y-Grade NGL to a field location by a high pressure pipeline or a tanker; offloading the Y-Grade NGL into a high pressure bulk storage tank; injecting the Y-Grade NGL as a component of a stimulation fluid; inducing a hydraulic fracture in a hydrocarbon bearing reservoir; producing the Y-Grade NGL along with other reservoir hydrocarbons back to the surface through a wellbore that penetrates the hydrocarbon bearing reservoir; and selling the Y-Grade NGL along with the other reservoir hydrocarbons to a gathering company, a gas plant, or a fractionation facility.

A system may comprise a nitrogen source, a Y-Grade NGL supply source, a foaming agent, a high pressure cylindrical vessel, a venturi eductor, a high frequency ultrasonic sonde, and/or a micro mesh screen.

A method may comprise supplying nitrogen from a nitrogen supply source; adding Y-Grade NGL from a Y-Grade NGL source and a foaming agent from a foaming agent source to the nitrogen; adding high pressure nitrogen from the nitrogen supply source to an inlet of a venturi eductor; adding the foaming agents to the Y-Grade NGL; supplying the nitrogen, the foaming agent and the Y-Grade NGL to the venturi eductor; mixing the nitrogen, the foaming agent, and the Y-Grade NGL via the venturi educator; spraying the mixture while exposing the mixture to high frequency ultrasonic vibration to form a foam; optionally passing the foam through a micromesh screen to remove larger unwanted foam bubbles; and discharging the foam to be used as a stimulation fluid.

A system may comprise a carbon dioxide source, a spray bar header, spray nozzles, a remote controlled emergency valve, a high pressure pump, a high pressure header, a stimulation fluid, and a wellhead.

A method may comprise locating a spray bar header with nozzles and a remote controlled emergency valve adjacent to a high pressure pumping system, a high pressure header, and a wellhead area; supplying carbon dioxide gas, carbon dioxide based foam, and/or air based foam from a bulk source to the remote controlled emergency valve; opening the remote controlled emergency valve; and shutting down the high pressure pumping system and the remote controlled emergency valve during an emergency situation to flood the wellhead area with carbon dioxide gas, carbon dioxide based foam, nitrogen gas, nitrogen based foam, and/or air based foam and suppress combustible mixtures.

A system may comprise two remotely controlled valves, a high pressure blow down line, a high pressure pump, a high pressure header, and a wellhead, wherein the high pressure blow down line is oriented down wind and is of sufficient length to be safely beyond the wellhead and any equipment or personnel.

A method may comprise connecting a blow down line with a remotely controlled valve via a flanged connection to a high pressure pumping header; adding an emergency valve to the high pressure pumping header upstream of a wellhead; in case of an emergency situation, opening the remotely controlled valve while simultaneously shutting-in the emergency valve; shutting down the high pressure pumping header; and diverting trapped stimulation fluid in the high pressure pumping header to the blow down line for discharge into the atmosphere.

A system may comprise a series of combustible gas detectors, a radio controlled transmitter and receiver, a remotely actuated control valve, a high pressure pump, a high pressure header, and a remote control room.

A method may comprise locating a series of combustible gas detectors adjacent to a high pressure pump, a high pressure header, a wellhead, a bulk Y-Grade NGL storage facility, and Y-Grade NGL transfer lines; connecting the series of combustible gas detectors to a remote control room; installing a remotely actuated control valve upstream of the wellhead; and in the event of detecting combustible gas, shutting down the high pressure pump and closing the remotely actuated control valve.

A method may comprise using all or a portion of a nitrogen source for a stimulation fluid, equipment and line purging, storage tank blanketing, and pneumatic conveyance of bulk proppant to an above ground membrane nitrogen generating system.

A method may comprise supplying an above ground nitrogen rejection system for the separation and recovery of nitrogen from a produced gaseous hydrocarbon stream from a hydrocarbon bearing reservoir to allow for commercial sales of the produced gaseous hydrocarbon stream, thereby eliminating the need to flare off gas.

A method may comprise blending Y-Grade NGL with at least one of nitrogen, carbon dioxide, a foaming agent, a proppant, a gelling agent, and an emulsifying agent to form a stimulation fluid; and pumping the stimulation fluid into a hydrocarbon bearing reservoir to create one or more fractures in the reservoir.

According to one embodiment, a foam may be created by the mixing of Y-Grade NGL with nitrogen or carbon dioxide, where said nitrogen concentration is greater than 50% or where said carbon dioxide concentration is greater than 35%, or by a combination of nitrogen and carbon dioxide where said combined concentration of nitrogen and carbon dioxide in greater than 50% causes the resulting gaseous mixture to be outside the Flammability Limit, sometimes referred to as the Explosion Limit in which a flammable substance such as Y-Grade NGL in the presence of air can produce a fire or explosion when an ignition source such as a spark or open flame is present.

Advantages of using a Y-Grade NGL stimulation fluid as described herein for a fracturing a hydrocarbon bearing reservoir is the elimination of the large quantities of water needed for traditional water-based fracturing operations. An additional advantage includes the prevention or elimination of scaling within the wellbore and reservoir caused by water-based stimulation fluids. An additional advantage includes maintaining the relative permeability of the reservoir that is usually damaged by water-based stimulation fluids. Additional advantages include enhanced imbibition, miscibility, adsorption, and flowback of a Y-Grade NGL stimulation fluid with the reservoir and reservoir fluids compared to water-based stimulation fluids.

While the foregoing is directed to certain embodiments, other and further embodiments may be devised without departing from the basic scope thereof, and the scope thereof is determined by the claims that follow.

The invention claimed is:

1. A stimulation fluid system, comprising:
a nitrogen and/or carbon dioxide source;
a fluid source in fluid communication with the nitrogen and/or carbon dioxide source;
a proppant source in fluid communication with the nitrogen and/or carbon dioxide source;
a receiver-blender in fluid communication with the fluid source and the proppant source; and
a pump configured to pump a stimulation fluid from the receiver-blender into a wellhead, wherein the stimulation fluid comprises a proppant from the proppant source, an unfractionated hydrocarbon mixture from the fluid source, and at least one of nitrogen and carbon dioxide from the nitrogen and/or carbon dioxide source, wherein the unfractionated hydrocarbon mixture is a byproduct of a de-methanized hydrocarbon stream, and wherein the unfractionated hydrocarbon mixture comprises ethane, propane, butane, isobutane, and pentane plus.

2. The system of claim 1, further comprising a foaming agent source and a foaming unit in fluid communication with the fluid source and the receiver-blender, wherein the foaming agent source comprises a foaming agent that includes at least one of a surfactant, a co-surfactant, and a co-solvent.

3. The system of claim 1, wherein the foaming unit includes a venturi eductor, a high frequency ultrasonic sonde, and/or a micro mesh screen.

4. The system of claim 1, further comprising a gelling agent source in fluid communication with the receiver-blender, wherein the gelling agent source comprises a gelling agent that includes phosphate esters and organo-metallic complex cross-linkers.

5. The system of claim 1, further comprising an emulsifying agent source in fluid communication with the receiver-blender, wherein the emulsifying agent source comprises an emulsifying agent.

6. The system of claim 1, further comprising a pressure regulation compressor configured to regulate pressure within the receiver-blender.

7. The system of claim 1, further comprising a field separation unit configured to receive a wet gas stream from the same or a different wellhead, separate the unfractionated hydrocarbon mixture from the wet gas stream, and supply the unfractionated hydrocarbon mixture to the fluid source directly via a fluid line or storage tankers.

8. The system of claim 1, further comprising air separation equipment configured to separate nitrogen from air and supply nitrogen to the nitrogen source.

9. The system of claim 1, further comprising of onsite pressurized storage vessels filled with additional amounts of the unfractionated hydrocarbon mixture supplied from a regional gathering pipeline, a regional gas splitter, or a gas processing facility via tanker trucks.

10. The system of claim 1, wherein the proppant source comprises a pressurized proppant silo where the proppant is temporally stored and pneumatically conveyed to the receiver-blender using nitrogen or carbon dioxide.

11. A method of pumping a stimulation fluid into a hydrocarbon bearing reservoir, comprising:
blending an unfractionated hydrocarbon mixture, a proppant, and at least one of nitrogen and carbon dioxide in a receiver-blender to form the stimulation fluid, wherein the unfractionated hydrocarbon mixture is a byproduct of a de-methanized hydrocarbon stream, and wherein the unfractionated hydrocarbon mixture comprises ethane, propane, butane, isobutane, and pentane plus; and
pumping the stimulation fluid into the hydrocarbon bearing reservoir.

12. The method of claim 11, further comprising blending a foaming agent and optionally a foam stabilizer with the unfractionated hydrocarbon mixture, the proppant, and at least one of nitrogen and carbon dioxide in the receiver-blender to form the stimulation fluid, wherein the foaming agent includes at least one of a surfactant, a co-surfactant, and a co-solvent, and optionally includes a foam stabilizer.

13. The method of claim 11, further comprising blending a gelling agent with the unfractionated hydrocarbon mixture, the proppant, and at least one of nitrogen and carbon dioxide in the receiver-blender to form the stimulation fluid, wherein the gelling agent includes phosphate esters and organo-metallic complex cross-linkers.

14. The method of claim 11, further comprising blending an emulsifying agent and water or brine with the unfractionated hydrocarbon mixture, the proppant, and at least one of nitrogen and carbon dioxide in the receiver-blender to form the stimulation fluid.

15. The method of claim 11, further comprising acquiring the unfractionated hydrocarbon mixture from a wet gas stream, a fluid line, or storage tankers, and supplying the unfractionated hydrocarbon mixture to a fluid source that is in fluid communication with the receiver-blender.

16. The method of claim 11, wherein the stimulation fluid includes a nitrogen concentration greater than 50%, a carbon dioxide concentration greater than 35%, or a combination of nitrogen and carbon dioxide concentration greater than 50% so that the stimulation fluid is outside the flammability limit.

* * * * *